US011050838B2

(12) United States Patent
Mohalik et al.

(10) Patent No.: US 11,050,838 B2
(45) Date of Patent: Jun. 29, 2021

(54) DATA FROM A SOURCE DEVICE TO A DATA REQUESTER (71) Applicant: Telefonaktiebolaget LM Ericsson (publ), Stockholm (SE)

(72) Inventors: Swarup Kumar Mohalik, Bangalore (IN); Ramamurthy Badrinath, Bangalore (IN); Sandhya Baskaran, Chennai (IN); Sambit Nayak, Bhubaneswar (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/764,922

(22) PCT Filed: Dec. 4, 2017

(86) PCT No.: PCT/IN2017/050569
§ 371 (c)(1),
(2) Date: May 18, 2020

(87) PCT Pub. No.: WO2019/111266
PCT Pub. Date: Jun. 13, 2019

(65) Prior Publication Data
US 2020/0304590 A1 Sep. 24, 2020

(51) Int. Cl.
*H04L 29/08* (2006.01)
*H04W 4/70* (2018.01)
(Continued)

(52) U.S. Cl.
CPC ...... *H04L 67/2842* (2013.01); *G06F 9/30189* (2013.01); *G06F 9/542* (2013.01);
(Continued)

(58) Field of Classification Search
CPC ........ H04L 67/28–67/288; H04L 67/34; H04L 67/42; G06F 9/30003–9/321; G06F 9/54–9/542
See application file for complete search history.

(56) References Cited

U.S. PATENT DOCUMENTS

| 2004/0003101 | A1* | 1/2004 | Roth | H04L 65/605 709/231 |
| 2007/0156845 | A1* | 7/2007 | Devanneaux | H04L 67/06 709/217 |

(Continued)

FOREIGN PATENT DOCUMENTS

CN    106330398 A    1/2017

OTHER PUBLICATIONS

Open Mobile Alliance, "Lightweight Machine to Machine Technical Specification: Core", OMA Spec Works, Version 1.1, Jul. 10, 2018, pp. 1-142, OMA-TS-LightweightM2M_Core-V1_1-20180710-A, OMA.

(Continued)

*Primary Examiner* — Clayton R Williams
(74) *Attorney, Agent, or Firm* — Coats & Bennett, PLLC (57) ABSTRACT It is provided a method for providing device data from a source device to a data requester. The method is performed in a data provider and comprises the steps of: determining operating mode being either a pass-through mode or a cache mode, based on estimated resource usage for each of the pass-through mode and the cache mode; receiving a read request from the data requester; when the data provider is in the pass-through mode, transmitting a corresponding read request to the source device and forwarding a read response from the source device to the data requester; when the data provider is in the cache mode, retrieving device data from storage of the data provider and transmitting a read response to the data requester, the read response comprising the (Continued)

device data from storage; and populating the storage of the data provider with device data received from the source device.

19 Claims, 4 Drawing Sheets

(51) Int. Cl.
  *G06F 9/30* (2018.01)
  *G06F 9/54* (2006.01)
  *H04L 29/06* (2006.01)
(52) U.S. Cl.
  CPC ............ *H04L 67/288* (2013.01); *H04L 67/34* (2013.01); *H04L 67/42* (2013.01); *H04W 4/70* (2018.02)

(56) References Cited

U.S. PATENT DOCUMENTS

| | | |
|---|---|---|
| 2014/0126367 A1 | 5/2014 | Stark et al. |
| 2015/0019686 A1* | 1/2015 | Backholm ............... H04W 4/18 709/217 |
| 2017/0048336 A1 | 2/2017 | Novo Diaz et al. |
| 2017/0237815 A1 | 8/2017 | Arsenault et al. |

OTHER PUBLICATIONS

Shelby, Z. et al., "The Constrained Application Protocol (CoAP)", Internet Engineering Task Force (IETF), Jun. 1, 2014, pp. 1-112, RFC 7252, IETF.

* cited by examiner

DATA FROM A SOURCE DEVICE TO A DATA REQUESTER

TECHNICAL FIELD

The invention relates to a method, data providers, a computer program and a computer program product for providing device data from a source device to a data requester.

BACKGROUND

The use of constrained devices is currently in a massive expansion phase, due to the increased interest in the so called Internet of Things (IoT), where small devices in a plethora of environments are made capable of communication using wireless and/or wired networks. Constrained devices are constrained in one or more of power usage (e.g. due to only being battery operated), processing power, network connectivity, etc. Constrained devices can e.g. be sensors reporting data and/or actuators being controlled from a remote device.

The Constrained Application Protocol (CoAP) is an application protocol which is similar to Hypertext Transfer Protocol (HTTP), but is simpler and involves less overhead. The CoAP protocol is particularly applicable to low power devices, such as IoT devices.

LWM2M (Open Mobile Alliance Lightweight Machine to Machine) is a protocol from the Open Mobile Alliance that targets the management of constrained devices, denoted LWM2M clients. It makes use of the CoAP protocol and creates a set of common interfaces for management. It also creates a reusable object model that defines the data sent between LWM2M clients and a LWM2M server.

LWM2M provides two operations to access data from the LWM2M clients: read and observe-notify. Read is an operation through which a data requester (such as an application on a server) pulls the required data from the source device. Observe-notify utilises a push-based operation: when a data requester needs data periodically or based on events, it issues the observe command and the source device then notifies the data to the data requester either periodically or when the event happens.

The LWM2M server processes and forwards the read/observe requests to the clients for each data requester independently. A LWM2M read operation exercises the LWM2M protocol twice: once on the forward request path (server to client to source device) and once on the backward data path (source device to client to server).

When there are a fairly large number of read requests, it makes sense to switch to a observe-notify mode. However, if there are less number of read requests, using observe-notify may be wasteful because the notified data may not be used by the data requester.

It is a delicate balance for the LWM2M server to know when it is more efficient, in terms of resource usage for the source device, to use read requests and when to use observe-notify.

SUMMARY

It is an object to improve efficiency in obtaining data from a source device, wherein the efficiency relates to resource usage of the source device.

According to a first aspect, it is provided a method for providing device data from a source device to a data requester. The method is performed in a data provider and comprises the steps of: determining operating mode for the data provider in respect of the source device, the operating mode being either a pass-through mode or a cache mode, based on estimated resource usage for each of the pass-through mode and the cache mode; receiving a read request from the data requester, the read request requesting device data from the source device; when the data provider is in the pass-through mode, transmitting a corresponding read request to the source device and forwarding a read response, comprising device data, from the source device to the data requester; when the data provider is in the cache mode, retrieving device data from storage of the data provider and transmitting a read response to the data requester, the read response comprising the device data from storage; and populating, when the data provider is in the cache mode, the storage of the data provider with device data received from the source device.

In the step of determining operating mode, the resource usage may comprise computation cost.

The resource usage may be estimated based on a density of predicted future read requests from data requesters towards the source device.

In the step of receiving a read request, the read request may comprise an indicator of acceptable device data age defining a maximum age of device data that is acceptable for the data requester. In such a case, the step of populating comprises ensuring the device data is populated sufficiently frequently to always satisfy the acceptable device data age.

The step of populating may comprise sending an observe command to the source device, causing the source device to repeatedly notify the data provider with current device data.

The step of populating may comprise sending a minimum wait time, indicating a minimum time duration following a notify from the source device during which no more notify actions will be performed by the source device to the data provider.

The step of populating may comprise sending a maximum wait time, indicating a maximum time duration following a notify from the source device after which the source device must perform a notify action to send current device data, even when the device data remains the same compared to a preceding notify action.

The read request and the read response may be transmitted in accordance with a LWM2M, Lightweight Machine to Machine, specification, version 1.0 or later.

The step of populating the storage of the data provider may be performed in a separate sequence of execution from the step of retrieving device data from storage.

According to a second aspect, it is provided a data provider for providing device data from a source device to a data requester. The data provider comprises: a processor; and a memory storing instructions that, when executed by the processor, cause the data provider to: determine operating mode for the data provider in respect of the source device, the operating mode being either a pass-through mode or a cache mode, based on estimated resource usage for each of the pass-through mode and the cache mode; receive a read request from the data requester, the read request requesting device data from the source device; when the data provider is in the pass-through mode, transmit a corresponding read request to the source device and forwarding a read response, comprising device data, from the source device to the data requester; when the data provider is in the cache mode, retrieve device data from storage of the data provider and transmitting a read response to the data requester, the read response comprising the device data from storage; and populate, when the data provider is in the cache mode, the storage of the data provider with device data received from the source device.

The resource usage may comprise computation cost.

The resource usage may be estimated based on a density of predicted future read requests from data requesters towards the source device.

The read request may comprise an indicator of acceptable device data age defining a maximum age of device data that is acceptable for the data requester. In such a case, the instructions to populate comprise instructions that, when executed by the processor, cause the data provider to ensure the device data is populated sufficiently frequently to always satisfy the acceptable device data age.

The instructions to populate may comprise instructions that, when executed by the processor, cause the data provider to send an observe command to the source device, causing the source device to repeatedly notify the data provider with current device data.

The instructions to populate may comprise instructions that, when executed by the processor, cause the data provider to send a minimum wait time, indicating a minimum time duration following a notify from the source device during which no more notify actions will be performed by the source device to the data provider.

The instructions to populate may comprise instructions that, when executed by the processor, cause the data provider to send a maximum wait time, indicating a maximum time duration following a notify from the source device after which the source device must perform a notify action to send current device data, even when the device data remains the same compared to a preceding notify action.

The read request and the read response may be transmitted in accordance with a LWM2M, Lightweight Machine to Machine, specification, version 1.0 or later.

The instructions to populate the storage of the data provider may be performed in a separate sequence of execution from the instructions to retrieve device data from storage.

According to a third aspect, it is provided a data provider comprising: means for determining operating mode for the data provider in respect of a source device, the operating mode being either a pass-through mode or a cache mode, based on estimated resource usage for each of the pass-through mode and the cache mode; means for receiving a read request from a data requester, the read request requesting device data from the source device; means for transmitting, when the data provider is in the pass-through mode, a corresponding read request to the source device and forwarding a read response, comprising device data, from the source device to the data requester; means for retrieving device data from storage of the data provider and transmitting a read response to the data requester, the read response comprising the device data from storage; and means for populating, when the data provider is in the cache mode, the storage of the data provider with device data received from the source device.

According to a fourth aspect, it is provided a computer program for providing device data from a source device to a data requester. The computer program comprises computer program code which, when run on a data provider causes the data provider to: determine operating mode for the data provider in respect of the source device, the operating mode being either a pass-through mode or a cache mode, based on estimated resource usage for each of the pass-through mode and the cache mode; receive a read request from the data requester, the read request requesting device data from the source device; when the data provider is in the pass-through mode, transmit a corresponding read request to the source device and forwarding a read response, comprising device data, from the source device to the data requester; when the data provider is in the cache mode, retrieve device data from storage of the data provider and transmitting a read response to the data requester, the read response comprising the device data from storage; and populate, when the data provider is in the cache mode, the storage of the data provider with device data received from the source device.

According to a fifth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
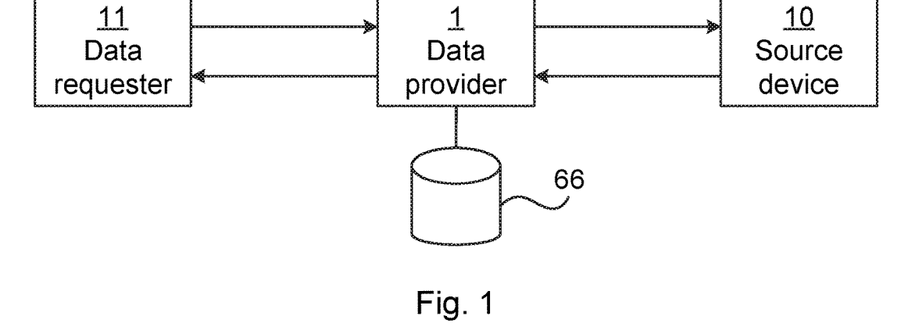
FIG. 1 is a schematic diagram illustrating an environment in which embodiments presented herein can be applied.

FIG. 1 is a schematic diagram illustrating an environment in which embodiments presented herein can be applied. A data requester 11 wants to retrieve device data from a source device 10. The data requester 11 can be any computer application which benefits from the device data provided by the source device 10. For instance, the data requester 11 can form part of an application program running on a server, desktop computer, laptop computer, tablet computer or smartphone or any other suitable device. While only one data requester 11 is shown in FIG. 1, the data provider can provide device data for a particular source device 10 to multiple data requesters 11.

The source device 10 can be a constrained device in a context of internet of things (IoT). Hence, the source device 10 may be extremely limited in terms of power usage (e.g. due to only being battery operated), processing power, network connectivity, etc. While only one source device 10 is shown in FIG. 1, the data provider 1 can be implemented to provide device data from a plurality of source devices 10.

A data provider 1 is located between the data requester 11 and the source device 10. The data provider 1 can be provided as part of a computer, e.g. a server, in order to facilitate communication between the data requester and the source device 10 and reduce power usage by the source device 10.

The data requester 11 and the data provider 10 can communicate using any suitable protocol, and can e.g. be based on Internet Protocol (IP), over any suitable bearer, including any one or more of Ethernet, WiFi, any cellular network, Bluetooth, etc. On top of the IP layer, the data requester can use UDP (User Datagram Protocol) and/or TCP (Transmission Control Protocol) and e.g. HTTP (Hypertext Transfer Protocol) and/or COAP (Constrained Application Protocol). Analogously, the data provider 1 and the source device 10 can communicate using any one or more of the mentioned protocols.

The data provider 1 also has access to a data storage 66, which may form part of the data provider or can be provided separately from the data provider.

When LWM2M is applied, the data requesters are LWM2M servers and the source devices are LWM2M clients. LWM2M provides two operations to access device data from the LWM2M clients: read and observe-notify. Read is an operation through which a data requester pulls the required device data from the source device. Observe-notify is a push-based operation: when an data requester needs device data periodically or based on events, it issues the observe command to the source device, whereby the source device notifies the device data to the data requester either periodically or when the event happens. Since the data provider 1 is between the data requester 11 and the source device, the data provider 1 acts as a LWM2M client for the data requester 11 and the data provider acts as a LWM2M server for the source device 10.

LWM2M read operation exercises the LWM2M protocol twice: once on the forward request path (server to client to device) and once on the backward data path (device to client to server). The LWM2M protocol is an application layer communication protocol between a LWM2M server and a LWM2M client.

Using embodiments presented herein, the total computation power required is reduced for providing device data from the source device 10, by appropriate switching between read and observe-notify modes for the source device 10. As explained in more detail below, this is achieved by setting the data provider 1 in one of two modes: pass-through mode or cache mode, for a particular source device 10.

FIGS. 2A-2D are sequence diagrams illustrating communication between various entities of embodiments which can be applied in the environment of FIG. 1.

Figure 2A:
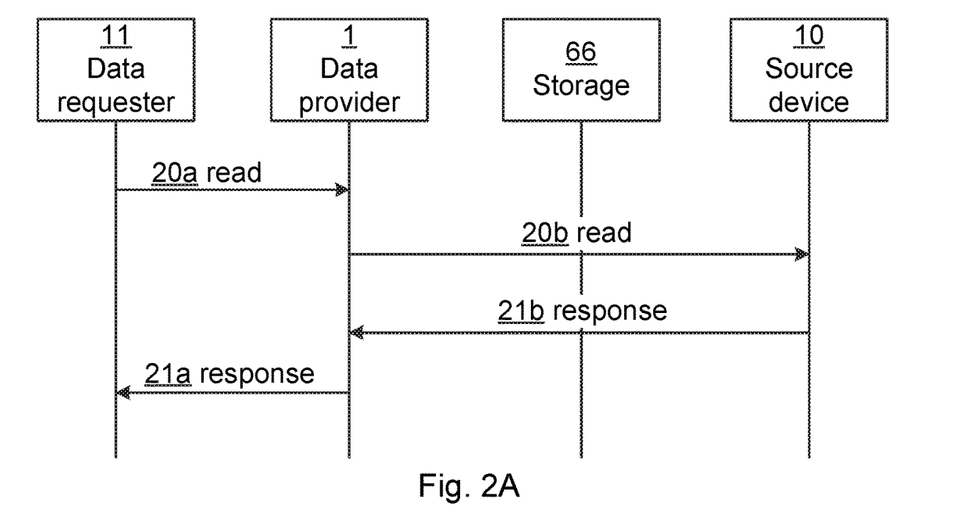
FIGS. 2A-2D are sequence diagrams illustrating communication between various entities of embodiments which can be applied in the environment of FIG. 1.

Looking first to FIG. 2A, this illustrates communication when the data provider is in pass-through mode for a particular source device 10.

The data requester 11 sends a read request 20a to the data provider 1. The data provider passes a corresponding read request 20b to the source device 10. Once the source device 10 sends a read response 21b, containing device data, to the data provider 1, the data provider 1 forwards a corresponding read response 21a to the data requester 11, containing the device data of the read response 21b from the source device 10.

In this pass-through mode, the data provider 1 thus forwards the read request from the data requester 11 to the source device 10 and forwards the read response from the source device 10 to the data requester 11. In other words, the pass-through mode is a form of pull based data retrieval.

Figure 2B:
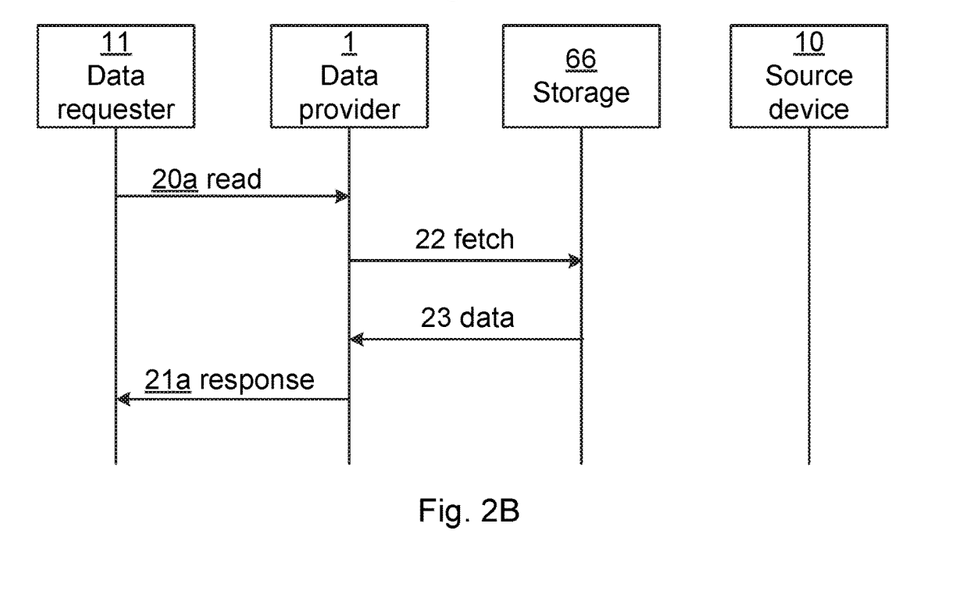
Figure 2C:
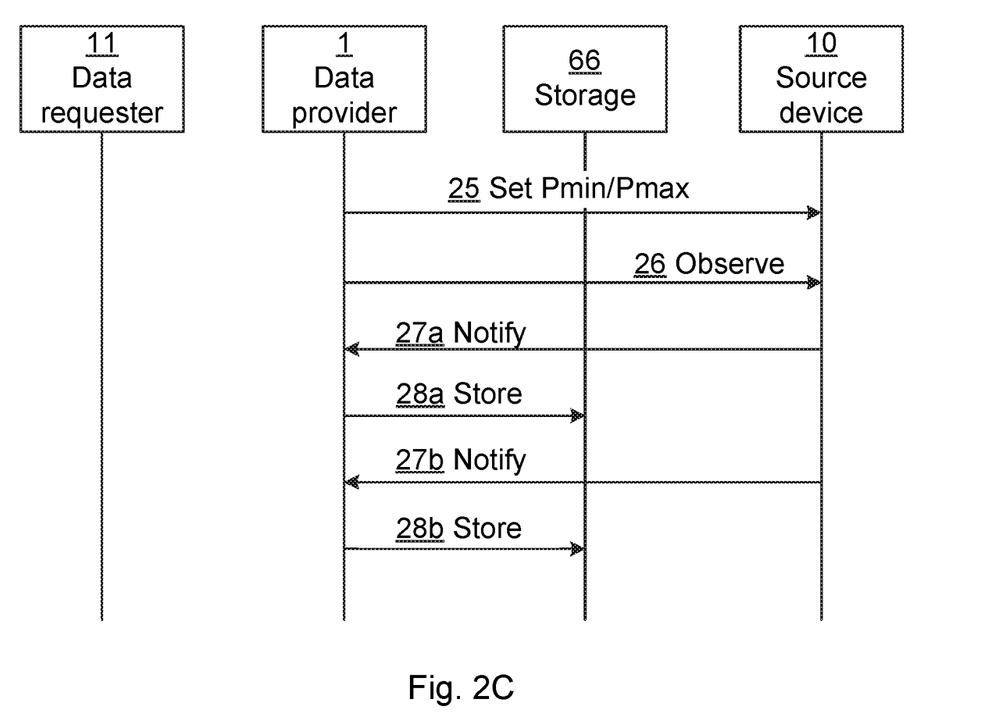
Figure 2D:
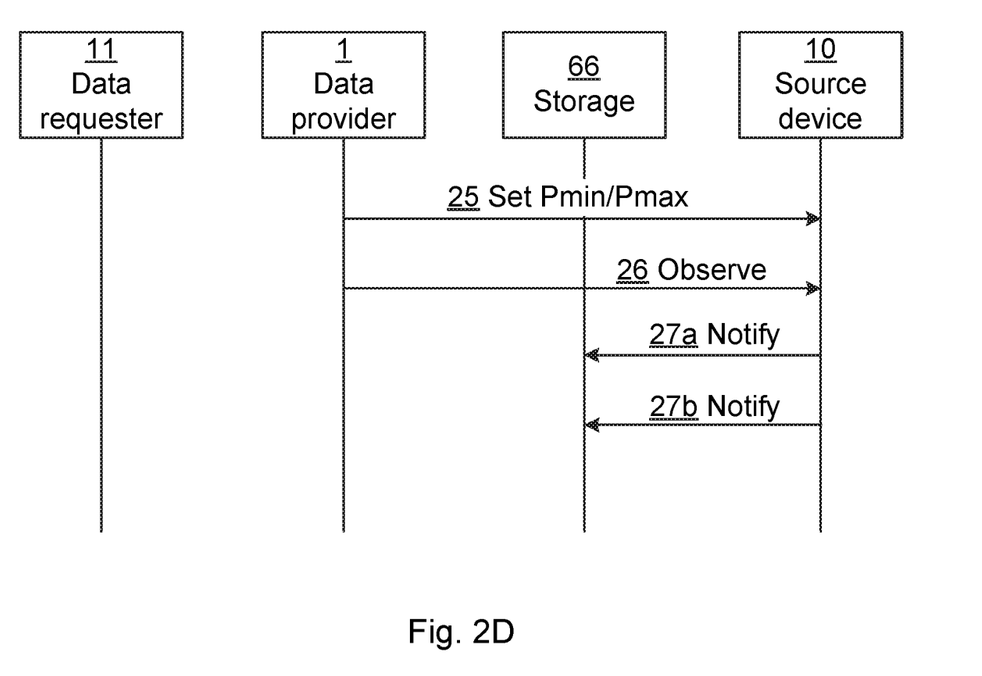

Looking now to FIG. 2B, this illustrates communication when the data provider 1 is in a cache mode for a particular source device 10. Prior to this sequence starting, the storage 66 has been populated with device data, e.g. as illustrated in FIGS. 2C and 2D, and explained below.

As in FIG. 2A, the data requester 11 transmits a read request 20a to the data provider 1. Here, however, the data requester 11 transmits a fetch 22 command to the storage 66 to obtain the device data from storage 66, instead of from the source device 10. The storage 66 response with the applicable device data 23, after which the data provider 1 composes a read response 21a comprising the device data and transmits this to the data requester 11.

In the cache mode, the data requester 11 receives the applicable device data, but the source device 10 does not need to do any communication, or any processing for this particular read request, thus saving a significant amount of power.

However, for the data provider 1 to be able to fetch the device data from storage 66, the storage 66 must have been populated with device data. This is illustrated in FIGS. 2C and 2D.

In FIG. 2C, the data provider 1 first transmits a command 25 to the source device 10 with two parameters: a minimum wait time (Pmin) and a maximum wait time (Pmax). The function of these parameters will be explained below.

The data provider also transmits an observe command 26 to the source device 10. The observe command 26 causes the source device 10 to repeatedly notify the data provider 1 with current device data. The type of device data to be transmitted from the source device 10 is specified in the observe command 26. At some point, the source device 10 transmits a first notify message 27a to the data provider 1. The first notify message 27a contains current device data. The data provider 1 then stores 28a the received device data in the storage 66. At a later stage, the source device 10 transmits a second notify message 27b to the data provider 1. The second notify message 27b contains current device data. The data provider 1 again stores 28b the received device data in the storage 66. This process continues in the same way until this procedure is stopped by the data provider 1 or the source device 10.

In this context, Pmin indicates a minimum time duration following a notify from the source device 10 during which no more notify actions will be performed by the source device 10 to the data provider 1. Furthermore, the Pmax indicates a maximum time duration following a notify from the source device 10 after which the source device 10 must perform a notify action to send current device data, even when the device data remains the same compared to a preceding notify action. In other words, Pmin and Pmax indicate minimum and maximum time between two consecutive notify messages.

The sequence illustrated in FIG. 2C is similar to FIG. 2D. Here, however, the observe command 26 comprises an indication that the source device 10 should send the device data to the storage 66. Hence, after the observe command 26, the source device 10 sends its notify messages 27*a*, 27*b*, . . . directly to the storage 66. This alleviates some processing in the data provider 1.

Figure 3:
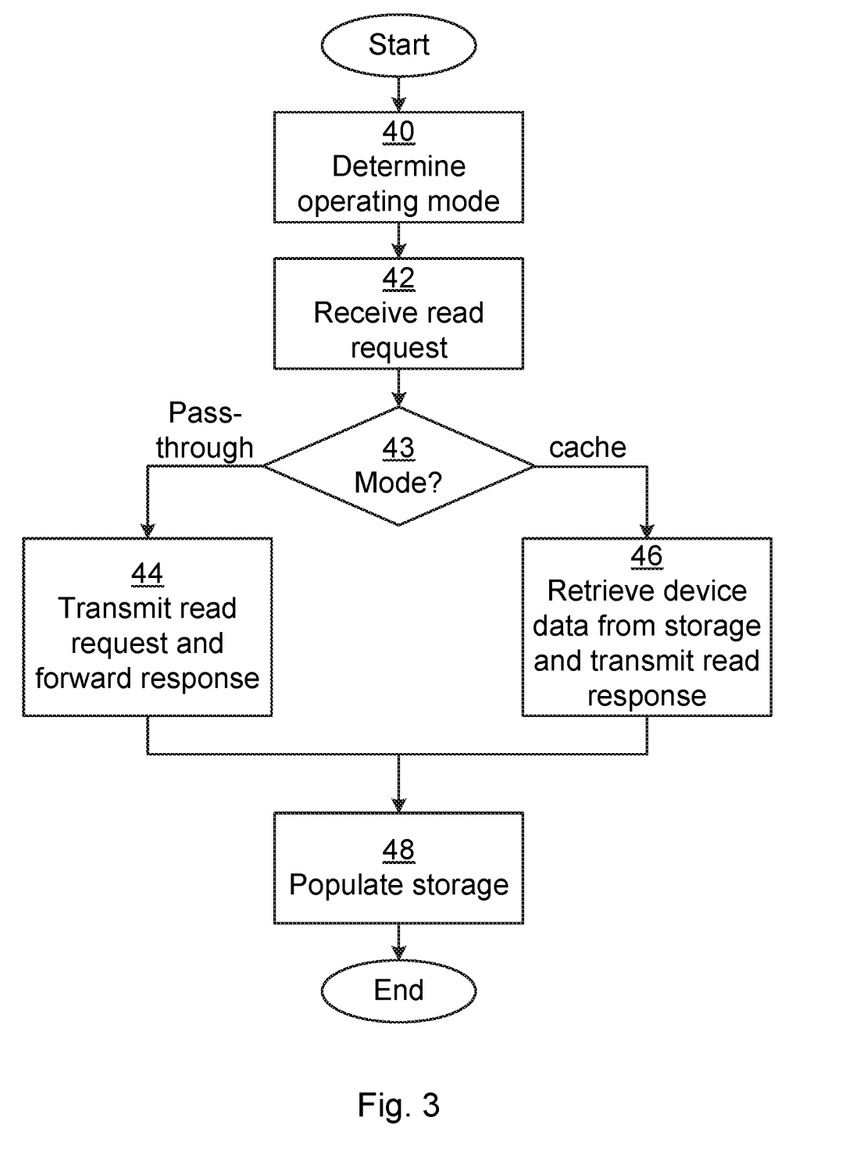
FIG. 3 is a flow chart illustrating embodiments of methods for providing data from a source device to a data requester performed in the data provider of FIG. 1.

FIG. 3 is a flow chart illustrating embodiments of methods for providing device data from a source device 10 to a data requester 11 performed in the data provider 1 of FIG. 1. As explained above, the data requester 11 can be one or more applications requesting device data from the source device 10.

In a determine operating mode step 40, the data provider 1 determines operating mode for the data provider 1 in respect of the source device 10. The operating mode is either a pass-through mode (see FIG. 2A) or a cache mode (see FIG. 2B). The operating mode is determined based on estimated resource usage for each of the pass-through mode and the cache mode. The resource usage can e.g. comprise computation cost. Computation cost is the amount of computation power required, for instance in terms of processor (CPU) usage. Also, the resource usage can be estimated based on a density of predicted future read requests from data requesters 11 towards the source device. In other words, the resource usage can be estimated based on many such read requests per time unit (e.g. second) are predicted to be received.

A way to determine the operating mode according to one embodiment will now be described. The determination is based on whether it is more efficient to obtain device data from the source device 10 using the read mode or the observe mode. When the read mode is more efficient, the operating mode is set to pass-through. When the observe mode is more efficient, the operating mode is set to cache.

Looking now to the read mode for the source device 10:

$c(read)=2*(c(data\ provider)+c(CoAP)+c(source\ device))=2*C1$ $t(read)=2*(t(data\ provider)+t(source\ device))$ where c( ) is the computation cost incurred in a specific node (in this case being either the data provider 1 or the source device), t( ) is the time taken by each node for performing required tasks for the communication to occur and C1 is a unit cost for c(data provider)+c(CoAP)+c(source device) defined here in the sole purpose of simplifying notation herein.

In other words, c(read) is equal to the computation cost for communication in the data provider 1 plus the computation cost for the CoAP protocol usage plus the computation cost for communication in the source device 10, all multiplied by two. The multiplication by two is there since the read implies both a read request and a read response, both implying a communication between the data provider 1 and the source device 10.

Now explaining t(read), t(read) is equal to the time for communication in the data provider 1 plus the time for communication in the source device 10, all multiplied by two. The time for the CoAP signal propagation is negligible. The multiplication by two is there since the read implies both a read request and a read response, both implying a communication between the data provider 1 and the source device 10.

On the other hand, when the source device 10 is in observe mode, there is one observe-notify request to register for notifications, and the data provider→CoAP→source device path is avoided for each subsequent notification of changed value.

$c(notify)=c(observe)=c(data\ provider)+c(CoAP)+c(source\ device)=C1$ $c(store)=c(insert\ in\ database)$ $c(fetch)=c(extract\ from\ database)$ $t(fetch)\sim=t(extract\ from\ database)$ Consider a time interval T, in which the observation frequency is f, and the number of requests for read from a data requester 11 are N. Observation frequency defines how often observations are sent from the source device 10 (on average). Then:

$waste(T)=N*c(Read)-[c(Observe)+T/f*c(Notify)+N*c(fetch)]=N*C1-[C1+T/f*C1+N*c(fetch)]$ If waste(T) is positive, it means cost of read is more than Observe-Notify-Store-Extract. Hence, by estimating the number of reads from data requester 11 semantics and/or history (e.g. using machine learning), waste for a future time period is predicted, leading to the selection of read mode or observe mode for the source device 10, corresponding respectively to a pass-through mode and cache mode for the data provider 1.

It is to be noted that step 40 can be performed in a separate sequence of execution from the other steps of the method. Separate sequence of execution can be implemented using separate threads or separate processes. Step 40 can be repeated at certain intervals and/or when a need to determine operating mode occurs.

In a receive read request step 42, the data provider 1 receives a read request from the data requester 11. The read request requests device data from the source device 10. Optionally, the read request comprises an indicator of acceptable device data age, defining a maximum age of device data that is acceptable for the data requester 11. For instance, a time critical application on the data requester 11 would have a much shorter acceptable device data age than an application on the data requester 11 which is not time critical. An example of a time critical application is an alarm sensor while an example of an application which is not time critical is weather sensors.

In a conditional mode step 43, the data provider 1 forks the method depending on the current operating mode. When step 40 occurs in a separate sequence of execution, the mode is communicated from the execution sequence of step 40 to the execution sequence of step 43, e.g. using inter-thread communication or inter-process communication. When the data provider 1 is in the pass-through mode (for the source device 10 in question), the method continues to a transmit read request and forward response step 44. When the data provider 1 is in the cache mode (for the source device 10 in question), the method continues to a retrieve device data from storage and transmit read response step 46.

In the transmit read request and forward response step 44, the data provider 1 transmits a read request (corresponding to the read request received in the receive read request step 42) to the source device 10. The data provider 1 forwards the read response, comprising device data, from the source device 10 to the data requester 11. This is illustrated in FIG. 2A.

In the retrieve device data from storage and transmit read response step 46, the data provider 1 retrieves device data from storage 66 of the data provider 1 and transmits a read response to the data requester 11. The read response then comprises the device data which has been retrieved from storage 66. This is illustrated in FIG. 2B.

The read request and the read response can be transmitted in accordance with a LWM2M, Lightweight Machine to Machine, specification, version 1.0 or later.

In a populate storage step 48, the data provider populates, when the data provider is in the cache mode, the storage of the data provider with device data received from the source device. The populate storage step 48 could be performed regardless of whether the current operating mode is the pass-through mode or the cache mode, but it is at least performed when the data provider is in the cache mode and is not necessarily performed when the current operating mode is the pass-through mode. It is to be noted that even though the populate storage step 48 is shown to occur after step 44 and step 46, the populate storage step 48 can be performed in a separate sequence of execution from the other steps of the method, and step 46 in particular. In other words, step 48 does not need to be performed each time step 46 is performed.

In one embodiment, this populating ensures the device data is populated sufficiently frequently to always satisfy the acceptable device data age. In other words, the storage is populated sufficiently often such that the acceptable device data age in the read request is satisfied. When several different acceptable device data ages have been received, the shortest acceptable device data age is the most strict requirement, and thus needs to be complied with. This can be achieved by sending an observe command to the source device 10. The observe command causing the source device 10 to repeatedly notify the data provider 1 (or the storage 66 directly) with current device data.

Optionally, this comprises sending a minimum wait time (Pmin). The minimum wait time indicates a minimum time duration following a notify from the source device 10 during which no more notify actions will be performed by the source device 10 to the data provider 1.

Further, this can comprise sending a maximum wait time (Pmax). The maximum wait time indicates a maximum time duration following a notify from the source device 10 after which the source device 10 must perform a notify action to send current device data, even when the device data remains the same compared to a preceding notify action.

When the data provider 1 switches to cache mode to reduce computation requirements in the source device 10 in a certain time duration, it may then also set the Pmin and Pmax attributes on the source device 10 before performing the observe action, as illustrated in FIGS. 2C and 2D.

A typical read request is used here as a baseline and compare the semantics of cache mode with it. T is used to denote the expected time a read request typically takes before replying back with its known device data. The idea is that the data provider 1 in cache mode should—at worst— wait T before replying back with the known device data. Such action by the data provider 1 addresses latency considerations for the requests for device data while servicing reads requests from its own layer in the cache mode. The data provider also ensures it is not serving old device data, or at least conforming to any desired staleness (acceptable device data age) semantics of the request, if any. How this is achieved is described above with reference to the populate storage step 48. The Pmin and Pmax attributes have certain implications on such behaviour, and the following approach is used by the data provider 1 for such attributes.

Setting Pmin=0 results in the behaviour that any change in the observed device data in the source device 10 is notified to the data provider 1, and thus the data provider 1 is assured that it gets the device data that a typical passed-through read request would have obtained. For this to be true, the typical time taken by a notification to be received by the data provider 1 must not be greater than T/2, which in turn means that a notification response from the source device 10 to the data provider 1 and its processing has similar cost/latency as a read response from the source device 10 to data provider 1. The only extra cost/latency in the case of notification to the data provider 1 is for the action of storing the device data, so if that if this is relatively small or of a smaller order as compared to T, then it does not affect the above described semantics significantly.

Setting Pmin to non-zero values implies more latency in the notification starting from the source device 10, and thus results in a greater possibility that a change in the observed device data is not immediately notified to the data provider 1, and so a read request serviced by the data provider 1 directly in cache mode can return somewhat older device data—essentially last known device data known to the data provider 1. The new device data would be notified to the data provider 1 after the Pmin window expires.

However, such an approach has the advantage of saving computation/power on the source device 10 during that Pmin window, in which the source device 10 does not need to "notify" changes to the data provider 1.

As mentioned above, one approach to address the potential staleness of the device data is to allow the read request to include a parameter for acceptable device data age, i.e. the request specifies how old device data it can tolerate. The data requester 11 doing read requests can exploit such capability according to their own requirements. The data provider 1 in turn would set the Pmin based on such values of acceptable device data age from multiple read requests.

Since the data provider 1 switches to cache mode based on predicted number/volume/density of read requests, it may be useful to predict a possible non-zero Pmin value to use as well. Such prediction can be based on learning from history of read requests. For instance, if there is a noticeable pattern of a large number of read requests with some values of acceptable device data age coming in at a specific time during the day, this may be due to several data requesters 11 kick-in their periodic daily activity around the same time.

When the data provider 1 is in the cache mode, and a read request arrives with a higher value of acceptable device data age than the predicted and configured Pmin value, then the predicted Pmin value suffices. But if a read request arrives with a lower value of acceptable device data age than the Pmin value configured by the data provider 1, then the data provider 1 will pass it through as a read request to the source device 10 directly, if it is a one-off request. If such a request is noticed by the data provider 1 as a periodic pattern in recent history, then the data provider 1 will learn and adapt to lower its predicted Pmin value accordingly.

Similarly, the data provider 1 will increase the Pmin as required based on periodic exploration of the values of acceptable device data age of read requests waiting at the data provider 1 layer.

Although it may be worth considering to set Pmax to as high a value as possible (which would benefit power and computation usage at the source device 10), it is to be noted that Pmax also serves as a heartbeat mechanism to the source device 10. This will depend upon the need of the data requester 11 to check the live status of the resource. In the absence of any other determination, Pmax can be set to 2*Pmin. Note that the LWM2M standard stipulates that Pmax>Pmin.

Using the method presented herein, the data provider 1 switches between the cache mode and the pass-through mode depending on what is best for the source device 10 in terms of resource usage, while complying with the requests from the data requesters 11. This significantly reduces resource usage for the source device 10.

Figure 4:
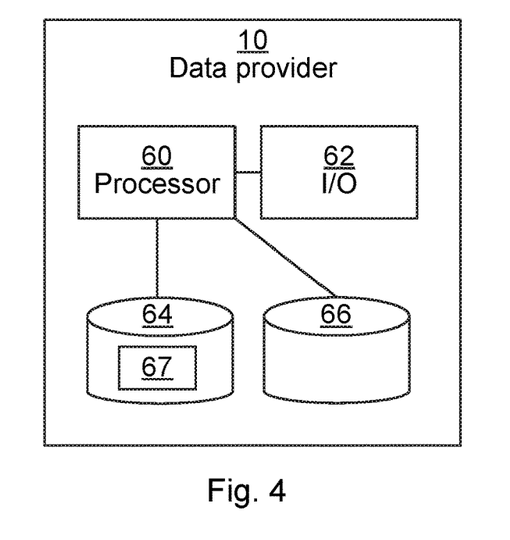
FIG. 4 is a schematic diagram illustrating components of the data provider of FIG. 1 according to one embodiment.

FIG. 4 is a schematic diagram illustrating components of the data provider of FIG. 1 according to one embodiment. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 3 above.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM). The data memory 66 can be any single one or combination of magnetic memory, optical memory, solid-state memory or even remotely mounted memory.

The data provider 1 further comprises an I/O interface 62 for communicating with external entities, such as the data requester and source device 10. Optionally, the I/O interface 62 also includes a user interface.

Other components of the data provider 1 are omitted in order not to obscure the concepts presented herein.

Figure 5:
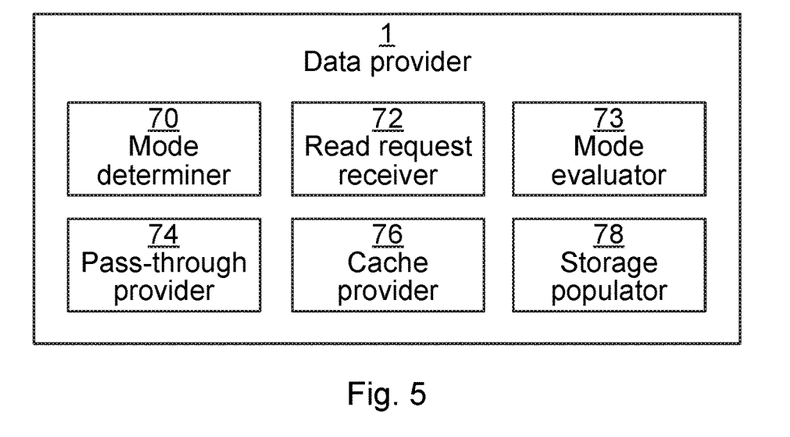
FIG. 5 is a schematic diagram showing functional modules of the data provider of FIG. 1.

FIG. 5 is a schematic diagram showing functional modules of the data provider 1 of FIG. 1 according to one embodiment. The modules are implemented using software instructions such as a computer program executing in the data provider 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 3.

A mode determiner 70 corresponds to step 40. A read request receiver 72 corresponds to step 42. A mode evaluator 73 corresponds to step 43. A pass-through provider 74 corresponds to step 44. A cache provider 76 corresponds to step 46. A storage populator 78 corresponds to step 48.

Figure 6:
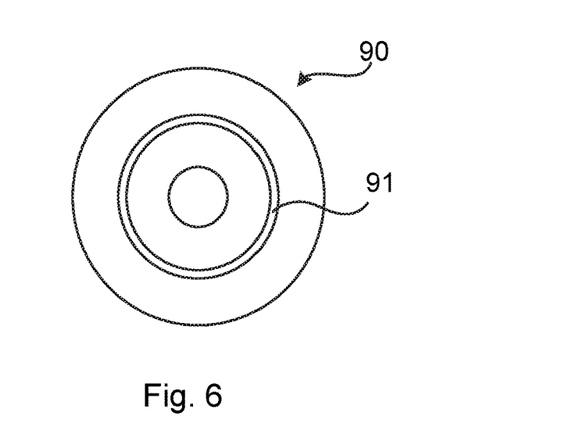
FIG. 6 shows one example of a computer program product comprising computer readable means.

FIG. 6 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for providing device data from a source device to a data requester, the method comprising a data provider:
determining an operating mode for the data provider with respect to the source device, the operating mode being either a pass-through mode or a cache mode, based on estimated resource usage for each of the pass-through mode and the cache mode;
receiving a read request from the data requester, the read request requesting device data from the source device;
when the data provider is in the pass-through mode, transmitting a corresponding read request to the source device and forwarding a read response, comprising device data, from the source device to the data requester;
when the data provider is in the cache mode, retrieving device data from storage of the data provider and transmitting a read response to the data requester, the read response comprising the device data from storage; and
populating, when the data provider is in the cache mode, the storage of the data provider with device data received from the source device.

2. The method of claim 1, wherein, in the determining the operating mode, the resource usage comprises computation cost.

3. The method of claim 1, wherein the resource usage is estimated based on a density of predicted future read requests from data requesters towards the source device.

4. The method of claim 1:
wherein the read request comprises an indicator of acceptable device data age defining a maximum age of device data that is acceptable for the data requester; and
wherein the populating comprises ensuring the device data is populated sufficiently frequently to always satisfy the acceptable device data age.

5. The method of claim 4, wherein the populating comprises sending an observe command to the source device, causing the source device to repeatedly notify the data provider with current device data.

6. The method of claim 5, wherein the populating comprises sending a minimum wait time indicating a minimum time duration following a notify from the source device during which no more notify actions will be performed by the source device to the data provider.

7. The method of claim 5, wherein the populating comprises sending a maximum wait time indicating a maximum time duration following a notify from the source device after which the source device must perform a notify action to send current device data, even when the device data remains the same compared to a preceding notify action.

8. The method of claim 1, wherein the read request and the read response are transmitted in accordance with a Lightweight Machine to Machine (LWM2M) specification, version 1.0 or later.

9. The method of claim 1, wherein the populating the storage of the data provider is performed in a separate sequence of execution from the step of retrieving device data from storage.

10. A data provider for providing device data from a source device to a data requester, the data provider comprising:
processing circuitry;
memory containing instructions executable by the processing circuitry whereby the data provider is operative to:
determine an operating mode for the data provider with respect to the source device, the operating mode being either a pass-through mode or a cache mode, based on estimated resource usage for each of the pass-through mode and the cache mode;

receive a read request from the data requester, the read request requesting device data from the source device;

when the data provider is in the pass-through mode, transmit a corresponding read request to the source device and forwarding a read response, comprising device data, from the source device to the data requester;

when the data provider is in the cache mode, retrieve device data from storage of the data provider and transmitting a read response to the data requester, the read response comprising the device data from storage; and populate, when the data provider is in the cache mode, the storage of the data provider with device data received from the source device.

11. The data provider of claim 10, wherein the resource usage comprises computation cost.

12. The data provider of claim 10, wherein the resource usage is estimated based on a density of predicted future read requests from data requesters towards the source device.

13. The data provider of claim 10:
wherein the read request comprises an indicator of acceptable device data age defining a maximum age of device data that is acceptable for the data requester; and
wherein the instructions are such that the data provider is operative to populate the storage of the data provider with device data received from the source device in such a manner as to ensure the device data is populated sufficiently frequently to always satisfy the acceptable device data age.

14. The data provider of claim 13, wherein the instructions are such that the data provider is operative to send an observe command to the source device, causing the source device to repeatedly notify the data provider with current device data.

15. The data provider of claim 14, wherein the instructions are such that the data provider is operative to send a minimum wait time indicating a minimum time duration following a notify from the source device during which no more notify actions will be performed by the source device to the data provider.

16. The data provider of claim 14, wherein the instructions are such that the data provider is operative to send a maximum wait time indicating a maximum time duration following a notify from the source device after which the source device must perform a notify action to send current device data, even when the device data remains the same compared to a preceding notify action.

17. The data provider of claim 10, wherein the read request and the read response are transmitted in accordance with a Lightweight Machine to Machine (LWM2M) specification, version 1.0 or later.

18. The data provider of claim 10, wherein the instructions are such that the data provider is operative to perform the populating the storage of the data provider in a separate sequence of execution from the retrieving device data from storage.

19. A non-transitory computer readable recording medium storing a computer program product for providing device data from a source device to a data requester, the computer program product comprising program instructions which, when run on processing circuitry of a data provider, causes the data provider to:

determine an operating mode for the data provider with respect to the source device, the operating mode being either a pass-through mode or a cache mode, based on estimated resource usage for each of the pass-through mode and the cache mode;

receive a read request from the data requester, the read request requesting device data from the source device;

when the data provider is in the pass-through mode, transmit a corresponding read request to the source device and forwarding a read response, comprising device data, from the source device to the data requester;

when the data provider is in the cache mode, retrieve device data from storage of the data provider and transmitting a read response to the data requester, the read response comprising the device data from storage; and populate, when the data provider is in the cache mode, the storage of the data provider with device data received from the source device.

* * * * *